United States Patent Office 2,959,477
Patented Nov. 8, 1960

2,959,477
PROCESS FOR THE RECOVERY OF MANGANESE COMPOUNDS FROM RHODONITE

Chester R. Beam, Richmond, and Cornelius E. Berthold, Trona, Calif., assignors to American Potash & Chemical Corporation, a corporation of Delaware No Drawing. Filed Dec. 8, 1958, Ser. No. 778,637

4 Claims. (Cl. 75—7)

This process pertains to a new and novel method of recovering the manganese values from rhodonite ore in which the manganese is present as $MnSiO_3$.

We have found that if rhodonite ore is roasted with sodium carbonate under reducing conditions, the manganese content of the ore can be recovered by leaching. More particularly, our process comprises, for example, sintering or roasting a mixture of sodium carbonate and rhodonite ore under reducing conditions at about 850° C. to 900° C. for one to one and one-half hours. The resulting sintered mass is quenched in water or a dilute leach solution and ground to about minus 60 mesh and then leached at boiling to remove as much of the soluble sodium and silica values as possible. We prefer to conduct the quenching and leaching operation using a dilute solution of sodium and silica values and then wash the residue in a counter-current decantation system.

After separation of the liquid and solid, the strong leach solution is evaporated and simultaneously carbonated to produce a concentrated solution of sodium carbonate for re-use and also produce a silica gel which is separated from the concentrated sodium carbonate solution, washed and dried. The concentrated sodium carbonate solution can be further concentrated, with or without carbonation, to precipitate a solid phase, which may be sodium carbonate monohydrate, sodium sesquicarbonate, or sodium bicarbonate, depending on the concentration and degree of carbonation. This concentrated solution or slurry containing most of the original sodium values is recycled back to be mixed with more rhodonite ore and carbon. Sodium carbonate must be added to the system to take care of losses.

We have found that the use of a one to one ratio of soda ash to rhodonite ore results in a maximum recovery of both sodium values and manganese values from the leached sinter. Other ratios of sodium carbonate to rhodonite can be used ranging from about one-half up to three or four parts of sodium carbonate per part of rhodonite ore. However, when ratios below one to one are used, the amount of sodium value recovered drops to nearly zero so that a large amount of make-up sodium carbonate is required. On the other hand, if more sodium carbonate is used, the sodium recovery system becomes excessively large and costly and no benefit is obtained in increasing manganese recovery.

It is preferred to maintain reducing conditions during the roast. This can be achieved in various ways as by suitable furnace operation, adding a small amount of carbon, i.e., about 10% based on the ore weight, or by both procedures.

Any of the conventional types of furnaces or kilns can be used to carry out the roasting operation, such as a multiple hearth roaster or a rotary kiln. A multiple hearth roaster is preferred since the roasting material is continually plowed up and mixed or rabbled during the time it is in the roasting furnace.

The leaching of sodium and silica values from the roasted sinter can be accomplished either hot or cold, at atmospheric or at elevated pressures. We prefer to quench the sintered material in the leach solution to conserve heat and also aid in shattering the sinter. There is no advantage in carrying out the leach operation at elevated pressure in an autoclave so the leach is effected at atmospheric pressure.

The water-leached sinter is separated from the sodium-containing leach solution and is then either leached with an aqueous solution of a mineral acid, such as hydrochloric or sulfuric acid or, preferably, the concentrated acid is mixed with the moist sinter and the mixture baked in a rotary kiln at a temperature of 200° C. to 500° C. for 0.5 to 4 hours. Baking the moist leached sinter with the appropriate acid results in an easily filtered residue since gelatinous silica is not formed under these conditions to cause filtration and settling problems. The acid-baked sinter is then leached with either acidified water or a dilute solution of the desired manganese salt to recover the solubilized manganese values therefrom.

The resulting manganese solution can be purified if desired by neutralizing to a pH of 4.5 to 5.5 to precipitate the iron, aluminum, and silica from the solution. The neutralization can be accomplished by adding a suitable alkali such as sodium carbonate or calcium carbonate. Divalent iron can be converted to the trivalent form by oxidation with compressed air. If the manganese-containing leach solution is manganese sulfate, the use of calcium carbonate as a neutralizing agent results in no additional contamination of the leach solution since the calcium is precipitated as calcium sulfate dihydrate or gypsum. The filtered, purified manganese solution is then either dried or converted to whatever other manganese compound is desired.

The invention is further illustrated by the following example. Fifty-seven parts of rhodonite ore were mixed with 5.7 parts of carbon 57 parts of sodium carbonate and roasted at 850° C. for 1.5 hours. The ore had the following composition:

Analysis of rhodonite ore

|  | Percent |
| --- | --- |
| Mn | 28.6 |
| $SiO_2$ | 48.1 |
| CaO | 2.8 |
| MgO | 0.4 |
| $Al_2O_3$ | 2.6 |
| $Fe_2O_3$ | 1.7 |
| $Na_2O$ | 0.5 |
| $K_2O$ | 0.2 |
| $CO_2$ | 4.1 |

The resulting sinter was quenched in a leach solution containing sodium hydroxide and silica and ground to approximately 60 mesh. This slurry was leached at boiling for two hours. The solids were washed in a four-stage counter-current decantation system and then filtered. The highly alkaline leach liquor, containing about 85% of the original sodium values, was concentrated and carbonate using a submerged combustion burner to precipitate the contained silica and simultaneously form sodium carbonate. The silica gel was filtered off and the resulting solution concentrated and carbonated further before mixing with a new batch of rhodonite ore. Additional make-up sodium carbonate was added to compensate for the losses incurred in the system.

The moist leached sinter amounting to 76 parts by weight was then mixed with 30 parts of 96% sulfuric acid and roasted at 350° C. for two hours. The acid-baked ore was then leached with a dilute manganese sulfate solution to recover the solubilized manganese values and the solids washed in a five-stage counter-current decantation system, filtered and discarded.

The pH of the leach solution was adjusted to 5 by the addition of limestone and the ferrous iron oxidized by injecting compressed air into the slurry. The precipitate containing the hydrous oxides of iron and aluminum, plus any silica, was then filtered out and the purified solution taken to dryness. The over-all manganese recovery was 94%.

We claim:

1. A process for recovering manganese from rhodonite ore comprising forming a mixture of from about one-half to four parts of sodium carbonate to one of rhodonite ore, heating the mixture under reducing conditions and in the presence of a solid carbonaceous material to about 850°–900° C. for about an hour and a half, cooling the heated mixture, and recovering the manganese values.

2. A process for recovering manganese from rhodonite ore comprising forming a mixture of about equal parts of sodium carbonate and rhodonite ore, heating the mixture under reducing conditions and in the presence of a solid carbonaceous material to about 850°–900° C. for about an hour and a half, cooling the heated mixture, and recovering the manganese values.

3. A process for recovering manganese from rhodonite ore comprising forming a mixture of from about one-half to four parts of sodium carbonate to one of rhodonite ore, heating the mixture under reducing conditions and in the presence of a solid carbonaceous material to about 850°–900° C. for about an hour and a half, cooling the heated mixture, grinding the cooled mixture, leaching sodium and silica values from the ground mixture to leave a solid residue containing manganese, and acid-leaching the solid residue to recover the manganese.

4. A process for recovering manganese from rhodonite ore comprising forming a mixture of about equal parts of sodium carbonate and rhodonite ore, heating the mixture under reducing conditions and in the presence of a solid carbonaceous material to about 850°–900° C. for about an hour and a half, cooling the heated mixture, grinding the cooled mixture, leaching sodium and silica values from the ground mixture to leave a solid residue containing manganese, and acid-leaching the solid residue to recover the manganese.

References Cited in the file of this patent

UNITED STATES PATENTS

| | | |
|---|---|---|
| 2,187,750 | Marvin | Jan. 23, 1940 |
| 2,850,370 | Trost et al. | Sept. 2, 1958 |

FOREIGN PATENTS

| | | |
|---|---|---|
| 112,417 | Australia | Jan. 28, 1941 |

OTHER REFERENCES

Hackh's Chemical Dictionary, 3rd edition, 1944, page 739.